United States Patent Office 3,440,057
Patented Apr. 22, 1969

---

3,440,057
FERMENTED MALT BEVERAGES CHEMICALLY PRESERVED
Thomas F. McFadden, New Bedford, and Theodore A. Schueler, South Dartmouth, Mass., assignors of one-third to Samuel E. Brown, New Bedford, Mass.
No Drawing. Filed Aug. 18, 1966, Ser. No. 573,179
Int. Cl. C12h 1/00; B01j 1/16; C09k 3/00
U.S. Cl. 99—48                                6 Claims

ABSTRACT OF THE DISCLOSURE

A fermented malt beverage containing a preserving amount of a diethanolamide represented by the formula

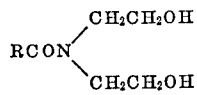

wherein R is an aliphatic hydrocarbon radical containing from 7 to 16 carbon atoms.

---

This invention relates to the preservation by chemical additives of beverages which usually require pasteurization before being packaged in bottles or cans for distribution. Malt beverages such as beer, ale and the like, when freshly made, contain small quantities of bacteria and yeast which, unless removed or inactivated, eventually spoil the beverage, producing sediment and ruining the flavor. Removal of the residual bacteria and yeast may be accomplished by membrane filtration but such a process is altogether too slow for commercial practice. Hence it has been the general practice to inactivate the bacteria and yeast by pasteurization. This process is effective but is troublesome and results in an undesirable change in the flavor of the beverage. It is an object of the present invention to preserve the freshness of the flavor of the beverage by adding a chemical which is compatible with the beverage but acts as a non-ionic surfactant to inactivate the bacteria and yeast.

For this purpose any one of a number of diethanolamides can be employed, these additives having the general formula:

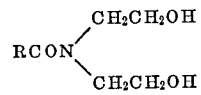

wherein R is an aliphatic hydrocarbon radical containing from 7 to 16 carbon atoms. The members of the series in this range, all of which exhibit preservative capability, are:

(1) caprylic diethanolamide, $$CH_3(CH_2)_6CON(CH_2CH_2OH)_2$$

(2) nonylic diethanolamide, $$CH_3(CH_2)_7CON(CH_2CH_2OH)_2$$

(3) capric diethanolamide, $$CH_3(CH_2)_8CON(CH_2CH_2OH)_2$$

(4) undecylic diethanolamide, $$CH_3(CH_2)_9CON(CH_2CH_2OH)_2$$

(5) lauric diethanolamide, $$CH_3(CH_2)_{10}CON(CH_2CH_2OH)_2$$

(6) tridecylic diethanolamide $$CH_3(CH_2)_{11}CON(CH_2CH_2OH)_2$$

(7) myristic diethanolamide, $$CH_3(CH_2)_{12}CON(CH_2CH_2OH)_2$$

(8) pentadecylic diethanolamide, $$CH_3(CH_2)_{13}CON(CH_2CH_2OH)_2$$

(9) palmitic diethanolamine, $$CH_3(CH_2)_{14}CON(CH_2CH_2OH)_2$$

(10) margaric diethanolamide $$CH_3(CH_2)_{15}CON(CH_2CH_2OH)_2$$

The preferred members of the diethanolamide series are the lauric and the myristic, or a mixture of these two in any proportion, relatively low concentrations of these members being found to be effective in preserving beverages, as illustrated in the following examples showing the results of experiments with samples of a finished fermented malt beverage containing various amounts of preservative. In each case the sample was "forced" by daily shaking of the bottle to fill the head-space in the bottle completely with foam, the bottles being stored at temperatures between 75° F. and 85° F. In the following tables the figures in the left-hand column represent the number of grams of preservative per million milliliters of beverage. The figures in the other columns indicate the sediment formed in the time intervals noted, the figures in the columns representing the following conditions:

(1) None
(2) Trace
(3) Very slight
(4) Slight
(5) Moderate
(6) Heavy

TABLE I.—MYRISTIC DIETHANOLAMIDE

| Parts per million | 1 month | 2 months | 3 months |
|---|---|---|---|
| 1 | 3 | 4 | 5 |
| 2 | 3 | 4 | 4 |
| 3 | 3 | 4 | 4 |
| 4 | 3 | 4 | 4 |
| 6 | 2 | 3 | 3 |
| 8 | 2 | 2 | 3 |
| 10 | 2 | 2 | 2 |
| 12 | 2 | 2 | 2 |
| 0-pasteurized control | 3 | 4 | 5 |
| 0-unpasteurized control | 5 | 6 | 6 |

TABLE II.—LAURIC DIETHANOLAMIDE

| Parts per million | 1 month | 2 months | 3 months |
|---|---|---|---|
| 3 | 3 | 5 | 6 |
| 4 | 3 | 4 | 5 |
| 6 | 3 | 4 | 5 |
| 8 | 2 | 4 | 5 |
| 10 | 2 | 4 | 5 |
| 12 | 2 | 3 | 4 |
| 14 | 2 | 3 | 4 |
| 16 | 2 | 3 | 3 |
| 0-pasteurized control | 3 | 4 | 5 |
| 0-unpasteurized control | 5 | 6 | 6 |

It appears from the foregoing tables that the more carbon atoms a diethanolamide has in its aliphatic chain, the smaller the quantity required to preserve a given quantity of beverage. However, for practical operation, other factors must be considered. For example, when using myristic diethanolamide, the matter of foam stabilization begins to be a problem which is increasingly greater for higher members of the diethanolamide series unless that tendency is counteracted by the addition of some other chemical substance suitable for the purpose.

The foregoing tables also indicate that although pasteurization leaves no viable organisms in the beverage, yet considerable sediment was formed by three months "forcing" as a result of the formation of insoluble proteinaceous matter in the beverage. Superior results in suppressing the formation of sediment were obtained by the use of sufficient myristic and/or lauric diethanolamides.

The use of diethanolamides as preservatives for beverages has the additional advantage of being easily applied. The point of application of such preservatives to a finished malt beverage should be as closely subsequent as practicable to the final filters. The following procedure is preferred. A 10% solution of the diethanolamide in water, propylene glycol, alcohol, or mixtures of two or more of these liquids is prepared. This solution is diluted to a precise 2% solution (grams/milliliters). By means of an apportioning pump, the amount of the 2% solution necessary to produce the desired concentration of the preservative in the final volume of beverage is added to the beverage. For this operation high-precision metering of the preservative solution is not required since the diethanolamides will not produce a difficultly redissolvable precipitate in the beverage in local excesses of up to 100 parts per million (grams%milliliters). Concentrations of this magnitude far exceed what is needed for effectively preserving the beverage. Thus chemical preservatives of the kind described can readily be added to finished fermented malt beverages on a commercial scale irrespective of whether the beverage is to be packaged in cans or bottles or distributed as a draught beverage.

We claim:

1. An unpasteurized fermented malt beverage containing a preserving amount of a diethanolamide represented by the formula

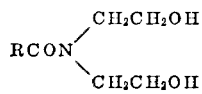

wherein R is an aliphatic hydrocarbon radical containing from 7 to 16 carbon atoms.

2. A beverage as claimed in claim 1, wherein R is represented by the formula $CH_3(CH_2)_n$ for values of $n$ from 6 to 15.

3. A beverage as claimed in claim 2, the preservative being myristic diethanolamide.

4. A beverage as claimed in claim 2, the preservative being lauryl diethanolamide.

5. A beverage as claimed in claim 2, the preservative being a mixture of myristic and lauryl diethanolamides.

6. A beverage as claimed in claim 2 wherein the preservative is present in a concentration of up to 50 parts by weight per million parts by volume (grams/milliliters).

References Cited

UNITED STATES PATENTS

| | | | |
|---|---|---|---|
| 3,048,488 | 8/1962 | Strandskov et al. | 99—48 |
| 3,175,912 | 3/1965 | Strandskov et al. | 99—48 |
| 3,234,138 | 2/1966 | Carroll et al. | 252—110 |
| 3,389,999 | 6/1968 | Strandskov et al. | 99—48 |

A. LOUIS MONACELL, *Primary Examiner.*

D. M. NAFF, *Assistant Examiner.*

U.S. Cl. X.R.

99—31, 150, 155, 213; 252—405